W. C. PAUL.
SHOCK ABSORBER.
APPLICATION FILED JUNE 16, 1917.
1,280,287. Patented Oct. 1, 1918.
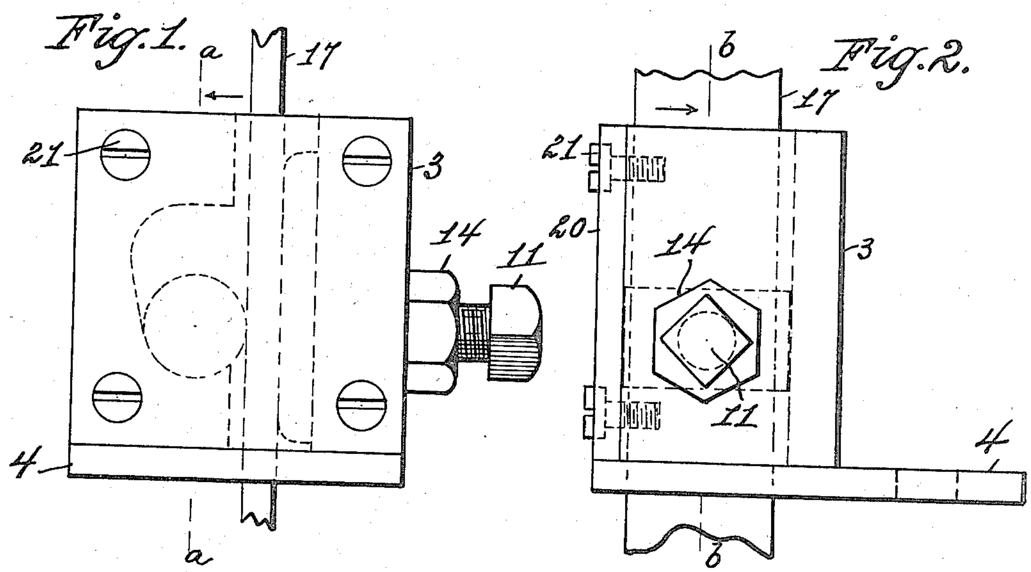
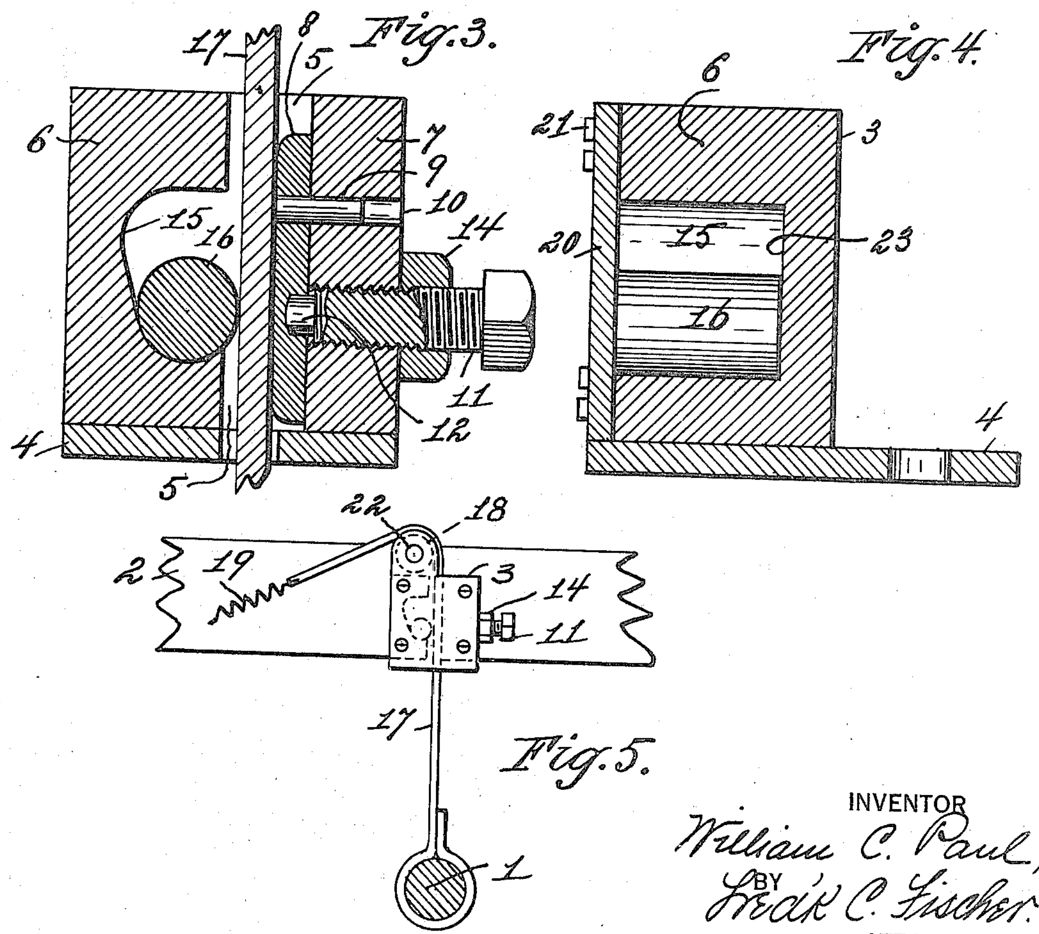
INVENTOR
William C. Paul,
BY
Fredk C. Fischer.
ATTORNEY

UNITED STATES PATENT OFFICE.

WILLIAM C. PAUL, OF NEWARK, NEW JERSEY, ASSIGNOR TO COMMON-SENSE MFG. COMPANY, OF NEWARK, NEW JERSEY, A CORPORATION OF NEW JERSEY.

SHOCK-ABSORBER.

1,280,287. Specification of Letters Patent. Patented Oct. 1, 1918.

Application filed June 16, 1917. Serial No. 175,056.

*To all whom it may concern:*

Be it known that I, WILLIAM C. PAUL, a citizen of the United States, residing in the city of Newark, in the county of Essex and State of New Jersey, have invented certain new and useful Improvements in Shock-Absorbers, of which the following is a full, clear, and exact description, such as will enable others skilled in the art to which it pertains to make, construct, and use the same, reference being had to the accompanying drawings and to characters of reference marked thereon, forming a part of this specification.

My invention relates to shock absorbers to be applied to automobiles or other vehicles, for absorbing shock and vibration and preventing injury to the vehicle springs incident to a rebound of the vehicle body when the vehicle to which they are attached, is passing over inequalities in the road bed.

The object of my invention is the production of a device of this character, which will be exceedingly simple in construction, durable in use, economical to manufacture, and efficient in its operation.

The invention comprises a casing having at one end means for attaching it to a part of the vehicle body, said casing being provided with a guide-way extending therethrough, a member supported by the axle or other part of the vehicle and extending through said guide-way, and a roller located in the guide-way, designed to have frictional holding engagement with said member.

Referring to the accompanying sheet of drawings, in which I have illustrated one preferable embodiment of my invention, I will proceed to describe the same, having it understood that I am not limited to the specific details of construction shown and described, as it is manifest that these may be modified and changed without departing from the spirit or scope of the invention.

Figure 1 represents a front elevation of a preferred form of my improved shock absorber.

Fig. 2 represents a side elevation of the same.

Fig. 3 represents a sectional elevation taken on line *b*—*b* of Fig. 2, and looking in the direction indicated by the arrow.

Fig. 4 represents a similar elevation taken on line *a*—*a* of Fig. 1, and looking in the direction indicated by the arrow; and Fig. 5 represents a side elevation of a slightly modified form of my improved shock absorber, showing its operative relation with the chassis and axle.

Similar characters of reference refer to like parts throughout the specification and drawings.

In the drawings, 1 represents the vehicle axle which is of usual and well-known construction. A portion of the chassis is represented by 2, to both of which are attached portions of the shock absorbing device. The shock absorber comprises a casing 3, preferably a casting of any convenient form or configuration, provided preferably with integral or other means, as for instance, a separate plate 4, as shown, preferably at one end thereof, for attaching it to a part of the vehicle, by ordinary means, such as bolts or the like. The casing 3 is provided with a guide-way 5, extending lengthwise thereof, said guide-way 5 being formed by the integral parts 6 and 7 of said casing 3. The integral part 7 of the casing 3, forming one side of the guide-way 5, has removably and adjustably secured thereto a friction plate 8, which is secured to one side of the guide-way by means of a dowel pin 9 secured to the friction plate, and received by a suitable aperture 10 located in the integral part 7 of the casing 3. In order to adjust the friction plate, I mount a headed screw 11 in the part 7, causing its inner end 12 thereof to project into the recess formed in the friction plate 8, and providing the other end thereof with a lock nut 14. By turning the screw 11 and lock nut 14, the adjustment of the friction plate 8 can be regulated.

The integral part 6 of the casing 3 forming the other side of the guide-way 5, has formed therein any convenient form of an inclined recess, plane, or cavity 15, for the reception of a cylindrical member or roller 16, operatively located in said recess or cavity, the ends of said roller being located between the rear wall 23 of the casing 3 and the closure plate 20. Passing through said guide-way 5 and interposed between the friction plate 8 and the cylindrical member or roller 16, is the member 17, which for convenience sake, may be a leather, canvas or metal strap, one end of which, in any convenient manner, is secured or supported by the vehicle axle 1 or any other part of the vehicle, the other end of which passes over a suitable roller 18, shown in Fig. 5, conveniently mounted on the top of the casing 3 and secured to the body of the vehicle by means of an ordinary spiral spring 19, in any desired or convenient manner.

In order to retain the cylindrical member or roller 16 and the leather, canvas or metal member 17 in their operative positions, and to prevent the accidental separation of the same from the casing 3, I secure to the front of said casing, in any desired or convenient manner, a closure plate 20, by means of screws 21 or the like.

In Fig. 5 of the drawings, in order to provide a suitable support for the stud 22 upon which the roller 18 is mounted, I extend the rear wall 23 of the casing 3, as well as the closure plate 20, as clearly indicated in Fig. 5.

In its normal or inoperative position, it will be noted from an inspection of Figs. 1 and 3 of the drawings, that the periphery of the roller or cylindrical member 16 projects slightly into the guide-way 5, and supported in the bottom of the inclined recess or cavity 15, and bearing lightly against the leather, canvas, metal or other member 17, and in its operative position, when a rough place in the road-way is encountered, the vehicle body will be lowered and the roller or cylindrical member 16 will move up a small distance in the inclined recess or cavity 15, permitting the leather, canvas or metal member 17 to freely pass through the guide-way 5 of the casing 3, but when the recoil takes place, due to the reaction of the springs, resistance to the upward movement of the vehicle body is offered by the action of the roller or cylindrical member 16, which is wedged against the leather or other member 17, and in this manner the recoil is dampened and the sudden jolt or jar due to the recoil is avoided, and the occupants of the car or vehicle ride with greater comfort.

From the foregoing description, taken in connection with the accompanying drawings, the advantages of the construction and the method of operation will be readily apparent to those skilled in the art, and while I have described the principle of operation of the invention, together with the device which I now consider to be the best embodiment thereof, I desire to have it understood that such changes may be made when desired as are within the scope of the invention as claimed.

Having thus described my invention, what I desire to claim and secure by Letters Patent is:—

1. In a shock absorber, a casing having a guide-way, provided with an inclined recess, extending lengthwise thereof, and having at one end means for attaching it to a part of a vehicle, a member supported by the axle or other part of the vehicle and extending through said guide-way, and a roller located in the bottom of the inclined recess of said guide-way, and normally projecting slightly into said guideway and in frictional engagement with said member.

2. In a shock absorber, a casing having a guide-way, provided with an inclined recess, extending therethrough, and provided with means for attaching it to a part of a vehicle, a roller located in said recess and normally projecting slightly into said guideway, a member supported by the axle or other part of the vehicle, extending through the guide-way and interposed between one side of the guideway and said roller and adjustable means to force said member into frictional engagement with said roller.

3. In a shock absorber, a casing having a guide-way, provided with an inclined recess, extending lengthwise thereof, and having at one end means for attaching it to a part of a vehicle, a member supported by the axle or other part of the vehicle and extending through said guide-way, a roller located in the inclined recess of said guideway and normally projecting slightly into said guideway, and guiding means carried by said casing adapted to guide said member.

4. In a shock absorber, a casing having a guide-way, provided with a recess, extending therethrough, and having at one end means for attaching it to a part of a vehicle, a member supported by the axle or other part of the vehicle, and extending through said guide-way, a friction roller loosely positioned in the recess of said guide-way, said roller normally projecting slightly into said guide-way and located on one side of said member, a friction plate positioned in the opposite side of the guideway and located against the opposite side of said member, means extending through one side of the casing to force the friction plate into frictional engagement with said member, a closure plate secured to the front of said casing to maintain said roller and member in operative position and a guide interposed between the rear wall of the casing and said closure plate adapted to guide said member.

5. In a shock absorber, a casing designed to be attached to a vehicle body, having a guideway extending therethrough provided with an inclined recess, a roller located in said inclined recess and normally projecting slightly into said guideway, a flexible member supported by the axle and extending through the guideway and interposed between one side of the guideway and said roller, and a spring secured to the other end of the flexible member and to the vehicle body.

6. In a shock absorber, a casing designed to be attached to a vehicle body, having a guideway extending therethrough provided with an inclined recess, a roller located in said inclined recess and normally projecting slightly into said guideway, a friction plate positioned in said guideway opposite to said inclined recess, a flexible member supported by the axle and extending through the guideway and interposed between said friction plate and said roller, and a spring secured to the other end of the flexible member and to the vehicle body.

7. In a shock absorber, a casing designed to be attached to a vehicle body, having a guideway therethrough provided with an inclined recess, a roller located in said inclined recess and normally projecting slightly into said guideway, a friction plate positioned in said guideway opposite to said inclined recess, a flexible member supported by the axle and extending through the guideway and interposed between said friction plate and said roller, a spring secured to the other end of the flexible member and to the vehicle body, and means for adjusting the distance between said roller and friction element.

This specification signed and witnessed this 6th day of June, 1917.

WILLIAM C. PAUL.

Witnesses:

FREDK. C. FISCHER,
CLIFFORD A. ALLISTON.